United States Patent

Welsch et al.

[11] Patent Number: 6,154,328
[45] Date of Patent: Nov. 28, 2000

[54] ADJUSTMENT ARRANGEMENT FOR REAR VIEW MIRRORS

[75] Inventors: Frank Welsch, Braunschweig; Conrad Oehlerking, Meine, both of Germany

[73] Assignee: Volkswagen AG, Wolfsburg, Germany

[21] Appl. No.: 09/121,287

[22] Filed: Jul. 23, 1998

[30] Foreign Application Priority Data

Feb. 3, 1996 [WO] WIPO ................... 196 03 879
Jan. 28, 1997 [DE] Germany ............. PCT/EP97/00356

[51] Int. Cl.$^7$ .................................................... B60R 1/06
[52] U.S. Cl. ....................... 359/877; 359/872; 307/10.1
[58] Field of Search ......................... 359/877, 872, 359/873, 874, 876, 843; 307/10.1

[56] References Cited

U.S. PATENT DOCUMENTS

| 4,811,226 | 3/1989 | Shinohara | 364/424.05 |
| 4,843,892 | 7/1989 | Krist | 73/865.4 |
| 5,233,228 | 8/1993 | Krieg | 307/10.1 |
| 5,668,675 | 9/1997 | Fredricks | 359/877 |
| 5,694,259 | 12/1997 | Brandin | 359/877 |
| 5,706,144 | 1/1998 | Brandin | 359/877 |
| 5,959,367 | 9/1999 | O'Farrell et al. | 307/10.1 |

FOREIGN PATENT DOCUMENTS

| 287993 | 10/1988 | European Pat. Off. | 359/872 |
| 0400633 | 12/1990 | European Pat. Off. | H01H 25/04 |
| 3406286 | 5/1985 | Germany | B60R 1/02 |
| 3609695 | 9/1986 | Germany | 359/877 |
| 3925978 | 2/1991 | Germany | B60R 1/06 |
| 4241543 | 6/1993 | Germany | B60R 1/06 |
| 4213133 | 10/1993 | Germany | B60R 1/06 |
| 0089433 | 5/1983 | Japan | 359/877 |
| 58-206441 | 12/1983 | Japan | B60R 1/06 |
| 359230838 | 12/1984 | Japan | 359/877 |
| 0050048 | 3/1985 | Japan | 359/877 |
| 60-050048 | 3/1985 | Japan | B60R 1/06 |
| 60-092134 | 5/1985 | Japan | B60R 16/02 |
| 0031540 | 2/1987 | Japan | 359/877 |
| 62-031540 | 2/1987 | Japan | B60R 1/02 |
| 62-234754 | 10/1987 | Japan | B60R 1/06 |
| 0286855 | 12/1987 | Japan | 359/877 |
| 62-286855 | 12/1987 | Japan | B60R 1/06 |
| 2106452 | 4/1990 | Japan | B60R 1/02 |
| 2106462 | 4/1990 | Japan | B60T 17/22 |
| 402234858 | 9/1990 | Japan | 359/877 |
| 403153432 | 7/1991 | Japan | . |
| 406064480 | 3/1994 | Japan | 359/877 |
| 406278534 | 10/1994 | Japan | 359/877 |
| 002279631 | 1/1995 | United Kingdom | 359/877 |
| 9616838 | 6/1996 | WIPO | B60R 1/02 |

*Primary Examiner*—Cassandra Spyrou
*Assistant Examiner*—John Juba, Jr.
*Attorney, Agent, or Firm*—Baker Botts L.L.P.

[57] ABSTRACT

An adjustment arrangement for at least two rear view mirrors of a vehicle has servo motors for positioning rear view mirrors by a pivoting and/or tilting mechanism, an actuating device for generating control signals for the common activation of the servo motors and a signal transmission device for transmitting signals between the actuating device and the servo motors. To carry out common adjustment of at least two mirrors with a mechanically simple system, the adjusting arrangement is configured so that the same control signal can be fed to the appropriate servo motors for the mirrors by the signal transmission device. During the adjustment action, the movements of the mirrors are in a predetermined relationship with one another.

6 Claims, 2 Drawing Sheets

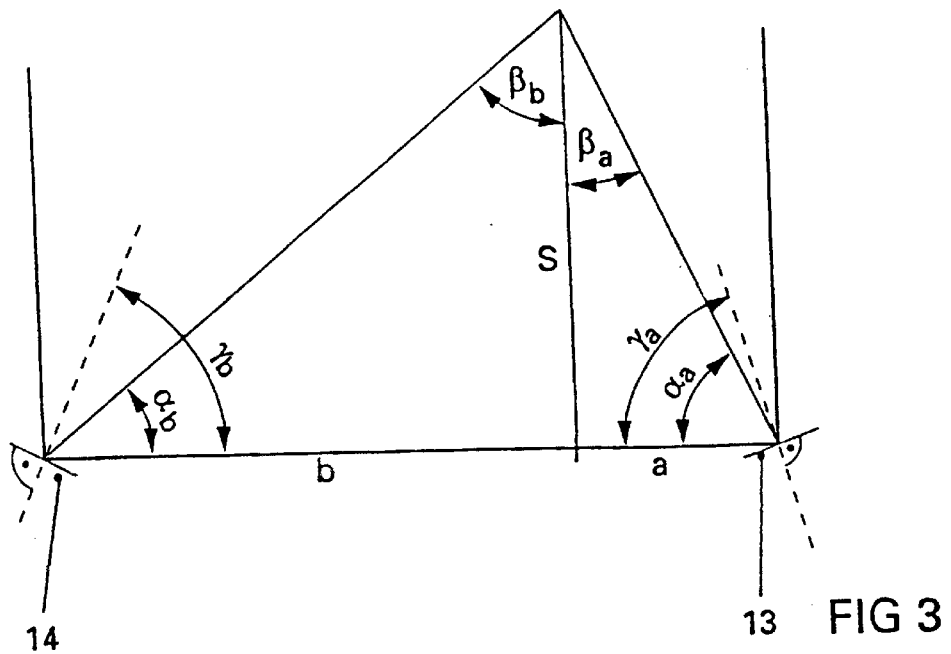
14                    13   FIG 3
FIG 4

ADJUSTMENT ARRANGEMENT FOR REAR VIEW MIRRORS

REFERENCE TO RELATED APPLICATION

This application claims benefit of International Application No. PCT/EP97/00356 filed Jan. 28, 1997.

BACKGROUND OF THE INVENTION

This invention relates to adjustment arrangements for a two or more rear view mirrors of a vehicle.

Japanese Patent Publications Nos. 60-050048 and 02-106462 disclose vehicle adjusting arrangements in which the joint adjustment of at least two rear view mirrors can be accomplished by using a selector switch unit. These selector switch units are constructed so that, in addition to a switch position for the joint adjustment, two additional switch positions are provided for the separate individual actuation of each rear view mirror. To permit joint adjustments of two rear view mirrors, therefore, a selector switch unit is disclosed having a structure which is fundamentally different from the two-step selector switch units which are conventional for ordinary mirror adjustment in the construction of vehicles.

Japanese Patent Publication No. 58-206441 describes an adjusting device for rear view mirrors which includes an interior rear view mirror as a servo element for automatic adjustment of two rear view mirrors. By using position sensors associated with the interior rear view mirror, the adjustment of the interior rear view mirror by the operator is utilized for automatic co-adjustment of the two exterior rear view mirrors.

German Patent No. 34 06 286 discloses a rear view mirror adjusting arrangement in which only a single setting of an actuating element is required for joint adjustment of two rear view mirrors. That arrangement has a comparator circuit which assures that, upon adjustment of a first rear view mirror, preferably, the one on the driver's side, the second rear view mirror, preferably the one on the passenger side, is automatically co-adjusted so that it too is optimally coordinated with the position of the driver's eye. In that patent, it is expressly noted that, for optimal adaption to a driver's eye position, different characteristics of the two rear view mirrors to be adjusted must be taken into account. That is accomplished by providing a separate transformer circuit which cooperates with the comparator circuit. The disclosed adjusting arrangement, which is considered to be advantageous in terms of operation, requires substantial cost for the sensory and regulatory electronic equipment required to carry out the basic functions.

An arrangement for joint adjustment of at least two rear view mirrors is also disclosed in German Offenlegungsschrift No. 42 41 543. In that arrangement, however, the joint adjustment is made from a so-called service position to a tilted shading position. In other words, the adjustment of rear view mirrors is made to avoid reflections from the headlights of following vehicles in the eyes of the vehicle operator, especially at night. The tilted antiglare positions of the two rear view mirrors, however, are not coordinated with each other.

SUMMARY OF THE INVENTION

Accordingly, it is an object of the present invention to provide an adjustment arrangement for rear view vehicle mirrors which overcomes disadvantages of the prior art.

Another object of the invention is to provide an adjusting arrangement for rear view vehicle mirrors by which a conventional adjustment function can be achieved with a reduced cost for equipment and circuitry and an improvement of the automatic mirror adjustment in terms of individual driver adaptation is provided at a cost comparable to that of conventional arrangements.

These and other objects of the invention are attained in accordance with one embodiment by providing an adjustment arrangement for rear view mirrors in which the adjustment of one mirror is substantially proportional to the adjustment of another mirror. In another embodiment, an actuating unit has a selector which, in one position, controls two or more mirrors and, in another position, controls only one mirror.

According to one embodiment of the invention, for the purpose of jointly adjusting at least two rear view mirrors, corresponding servo motors for the mirrors receive identical signals from an actuating unit to produce mirror motions having a predetermined relationship to each other. The adjustment may be made, for example, on a key pad or, in a preferred embodiment of the invention, on an interior rear view mirror of the type described in German Offenlegungsschrift No. 39 25 978 and is converted by a signal transmission unit into a servo signal that is supplied to both servo motors. The resulting joint motions of the mirror elements then occur in the preset relationship to each other.

In accordance with the invention, the relationships between the different characteristics in the adjustment of rear view mirrors are essentially reducible to a linear relationship which produces a result acceptable to the operator of a vehicle. Thus, for example, it is sufficient to adjust the second mirror element in proportional dependency to the setting of the first mirror element. In the adjusting arrangement according to the invention, such a relationship can be set by providing a predetermined adjustment speed difference while using the same adjusting time for the servo motors or, conversely, adjusting the mirrors at the same speed for both servo motors but for different time periods. Supplementarily or alternatively, the transmission ratios for the pivoting and/or tilting mechanisms between the servo motors and the mirror elements can be selected for each vehicle type.

In a second embodiment, a selector is provided in connection with the actuating unit in which a so-called 'right-and-left mode' has a preassigned basic setting. To adjust a vehicle- or driver-specific field of view, the rear view mirror on the passenger side, for left hand drive vehicles, can be set in a second selected position, that is in a 'right mirror only mode,' without co-adjustment of the rear view mirror on the driver's side. Then, for normal operation, by switching the selector back into the first selected position, the joint adjustment of both rear view mirrors can be accomplished.

Advantageously, the mirror adjusting arrangement according to the invention makes possible the use of conventional key switches, as described for example in European Application No. 04 00 633 or German Patent No. 42 13 133. The integration of a selector switch in the actuating unit, described particularly in the German Patent, can be favorably employed in the adjusting arrangement according to the invention.

From these relationships, it becomes clear that specifically only the wiring and labeling of the actuating units need be altered to realize the second embodiment of the invention on vehicles which are already in production. Weight, assembly and per-vehicle cost are unaffected. Therefore, a current production series vehicle may be supplemented with or converted to provide the adjusting arrangement according to the invention at low cost. Utilizing the invention by way of a retrofit kit for vehicles which are already on the market is also possible just as easily.

In another embodiment identical servo motors are used for the mirrors and worm or gear transmissions linking the servo motors with the mirrors have different but proportional transmission ratios. With this arrangement, a highly economical solution can be realized, because the like design of the servo motors, especially for mass production manufacturers, permits low costs. Also, the spindle, worm or gear transmissions required for the adjusting movement of the mirror elements, of which many different conventional arrangements are known, may to a large extent have the same construction with respect to a fixedly preassigned transmission ratio.

If identical transmission ratios are provided and the servomotor running times or speeds are varied, the integration of a switch element in the signal transmission unit is possible so that, during the adjusting motion, the speed and/or the running time of the second servomotor, which is preferably of the same construction as the first, is altered in substantially direct proportion to that of the first servo motor which is directly controlled by the actuating unit in accordance with the predetermined relationship.

It should be noted at this point that all rear view mirrors of any type of vehicle can be connected to an adjusting arrangement according to the invention. In this regard it has been found that, according to the invention, when the interior rear view mirror has been properly adjusted, its position also has a fixed relationship to the respective positions of each of exterior rear view mirrors. Thus, as described above, the interior rear view mirror itself may serve as an actuating unit, or in the case of automatic adjustability, be coupled to the adjustment of one of the exterior mirrors. In today's conventional passenger motor vehicles, therefore, upon a change of the vehicle driver, only one of the three mirrors need be adjusted. Automatic adjustment of the other two mirrors then follows according to fixed predetermined relationships. When the interior rear view mirror is used as an actuating unit, the adjusting switches or key pads for the exterior mirrors may be eliminated if desired. The added cost of using a position sensor system associated with the interior rear view mirror would then be more or less offset by elimination of the adjusting switches for the other mirrors.

For improved adaption of the mirror adjustment to a vehicle operator's head position, additionally or alternatively, the location of the driver's seat and the inclination of the back rest may be determined by suitable sensors. In the signal transmission unit, the signals provided by these sensors are taken into account for the control of the respective mirror settings.

BRIEF DESCRIPTION OF THE DRAWINGS

Further objects and advantages of the invention will be apparent from a reading of the following description in conjunction with the accompanying drawings in which:

FIG. 3 is a diagram showing the geometrical relationships for rear view mirror arrangements in the vehicle of FIG. 1; and FIG. 4 is a graphical illustration showing the relationship between the angular positions of two exterior mirrors, as determined in accordance with FIG. 3.

DESCRIPTION OF PREFERRED EMBODIMENTS

Figure 1:
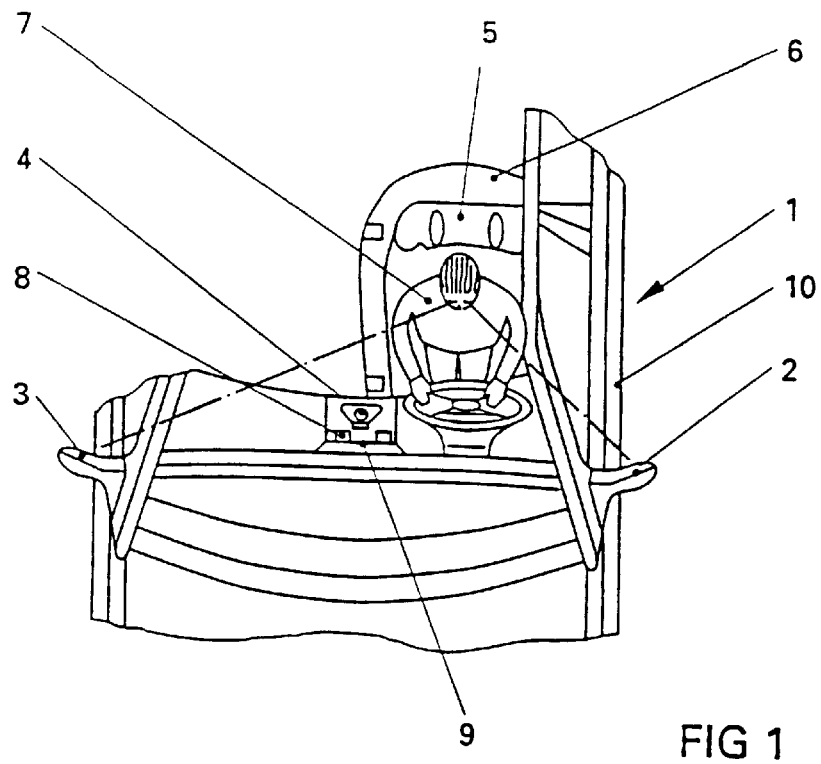
FIG. 1 is a fragmentary view of a passenger motor vehicle provided with an adjusting arrangement according to the invention, showing the mirrors in the basic initial positions.

In all figures, like parts have the same reference numerals.

In the typical embodiment shown in FIG. 1, a vehicle 1 of the left hand drive type has the essential components for the adjusting arrangement according to the invention including an exterior rear view mirror 2 on the driver's side, an exterior rear view mirror 3 on the passenger side, and an interior rear view mirror 4. In a driver's seat 6 having a back rest 5, a person 7, who is the operator of the vehicle, can use an actuating unit 8 to control the positions of the exterior mirrors 2 and 3 and, in a modification designed for special comfort, the interior rear view mirror 4. In the typical example shown in the drawings, the actuating unit 8 is associated with a control system on a central shelf 9. Alternatively, however, the actuating unit 8 could be mounted in the trim, not shown in detail, of a driver-side door 10. It is expressly noted here that the adjusting arrangement according to the invention may be used equally well in left hand drive or right hand drive motor vehicles. Accordingly, the exterior mirrors are usually referred to herein as "right" and "left" mirrors rather than mirrors on the driver and passenger sides.

Figure 2:
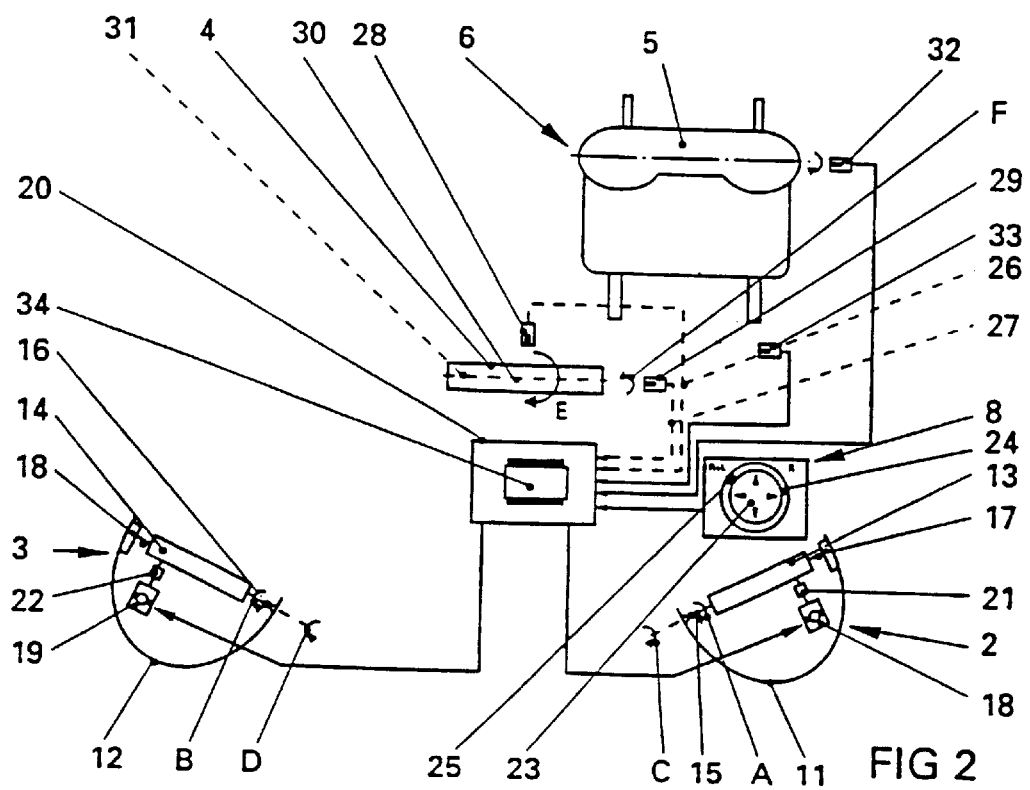
FIG. 2 is a schematic diagram showing a typical embodiment of an adjusting arrangement according to the invention.

FIG. 2 shows two housings 11 and 12 for the exterior mirrors 2 and 3, respectively, in which mirror elements 13 and 14 can pivot about bearings 15 and 16, which may be ball-and socket joints for example, as indicated by arrows A and B, and tilt as indicated by rotation arrows C and D on axes of rotation 17 and 18. To pivot the mirror elements 13 and 14 about the bearings 15 and 16, two servo motors 18 and 19 are provided, both of which are actuable by a signal transmission unit 20. To adjust the positions of the mirror elements 13 and 14, adjusting spindles 21 and 22, which are indicated schematically, are provided. For reasons of clarity, the servo motors to accomplish the tilting motions about the axes C and D are not shown in the drawing. However, a detailed description of such tilting arrangements may be found in the above-cited German Offenlegungsschrift No. 42 41 543 in connection with FIGS. 2 and 5 thereof. The basic structure of the interior rear view mirror 4 is also described in that reference in connection with FIGS. 3 and 4.

In accordance with one embodiment of the invention, a key pad 23 and a selector switch 24 capable of limited rotation between positions marked "R+L" and "R" are combined in the actuating arrangement 8. A mark 25 on the face of the selector switch 24 in the form of a spot and/or knob-like elevation indicates the first selected position. In the specific position of the selector switch 24 show in FIG. 2, therefore, the 'right-and-left mode' is selected. This mode is referred to herein as the basic setting. By rotating the selector switch 24 clockwise, the so-called 'right only' mode can be selected as the second position. In the illustrated mode a simultaneous adjustment of both mirror elements 13 and 14 is effected by manipulating the key switch 23 whereas, if the mark 25 is moved to the "R" position, only a separate adjustment of the mirror element 14 is possible. The left mirror element 13 thus remains in the position last set when coming out of the 'right-and-left mode.'

The selector switch is illustrated in the drawing as a rotary switch. Alternatively, however, an arrangement of two pressure switches can be provided, the first position being selected by actuating one switch and the second position by actuating the other switch as described for example in the above-cited German Patent No. 42 13 133.

Two dotted lines 26 and 27 in FIG. 2 indicate that the interior rear view mirror 4 may optionally be used as an actuating element. In that case, position sensors 28 and 29 are required to detect motions of the interior rear view mirror 4 about an axis 30 as shown by a rotary arrow E, and tilting motions about an axis 31 as shown by a rotary arrow F, and to provide servomotor control signals. With this arrangement, the actuating element 8 may be omitted if desired. In addition, a third setting may be provided on the actuating element 8 so as to permit preselection of an 'interior rear view mirror mode.' Similarly, the signal transmission unit 20 may be supplied with signals from a back rest inclination sensor 32 and a driver's seat position sensor 33 for better adaption of the adjustment of the interior rear view mirror 4 to the particular stature of the person 7. Independently of use in the adjusting device according to the invention, the sensors 28, 29, 32 and 33 may cooperate with a computer unit 34 to provide a warning signal to the signal transmission unit 20 to automatically signal maladjustment of the interior rear view mirror 4 with respect to the particular position of the vehicle operator 7 by acoustic or visual indicators. The signal of only one of the two sensors 32 and 33 may be a controlling signal.

The geometrical relationships of the mirrors in the arrangement shown in FIG. 2 are illustrated in FIG. 3. The calculation of the relationship between the positions of the mirror elements 13 and 14 is based on the assumption that the optimum mirror setting for the person 7 is given by the relationship $\gamma_a = \alpha_a + 0.5\ \beta_a$. Correspondingly, $\gamma_b = \alpha_b + 0.5\ \beta_b$. By calculation, the relationship between the angles $\gamma_a$ and $\gamma_b$ produces a curve as shown in FIG. 4. The substantially linear relationship is quite apparent here. It should be noted here that the width of a motor vehicle determines the value of the segment a+b and the position of the driver's seat with respect to the centerline of the vehicle is represented by the value of the quotient a/b.

In a specific embodiment of the invention in which application of the relationships illustrated in FIGS. 3 and 4 results in a ratio a/b=0.43, the transmission ratios of the adjusting spindles 21 and 22 are in the relation 1:1.17 or 1:1.18. Accordingly, an angular adjustment of the mirror element 13 would result in an angular adjustment of the mirror element 14 which is greater than that of the mirror element 13 by an amount corresponding to the ratio between the transmission of the adjusting spindles 21 and 22, so that an optimum mirror setting is obtained on the passenger side as well.

Practical tests show, however, that a ratio of 1:1 in the transmission ratios will yield acceptable accuracy of adjustment. In that case, vehicles in production can be converted to the adjusting arrangement of the invention at minimal cost.

Thus, by providing the above-mentioned advantages, in particular by using technology already present in vehicles and consequently proven, the adjusting arrangement according to the invention provides a high degree of dependability of operation for the vehicle operator. Moreover, the invention may also be used in advanced concepts in which signals provided to actuating elements are utilized through central control electronics to adjust mirror elements on doors and/or inside the vehicle.

Although the invention has been described herein with reference to specific embodiments, many modifications and variations therein will readily occur to those skilled in the art. Accordingly, all such variations and modifications are included within the intended scope of the invention.

We claim:

1. An adjusting arrangement for adjusting a plurality of vehicle rear view mirrors comprising:

a plurality of rear view mirrors including a driver's side mirror and a passenger's side mirror;

mirror positioning means including a plurality of servo motors for positioning the mirrors by at least one of pivoting and tilting mechanisms;

actuating means for generating servo signals for joint activation of the servo motors;

selector switch means associated with the actuating means having a first operative mode to permit joint adjustment of at least two mirrors and a second operative mode to permit separate adjustment of only one of the mirrors;

signal transmission means for transmitting signals between the actuating means and the servo motors to produce adjustment of the mirrors; and a two position mirror selector switch in the selector switch means which is switchable between only two selected operative positions;

one of the two selected positions permitting proportional joint adjustment of the plurality of mirrors;

the other of the two selected positions permitting separate adjustment of only one side mirror without permitting adjustment of any other mirror.

2. An adjusting arrangement according to claim 1 wherein the plurality of mirrors are adjustable in a 1:1 ratio by operation of the servo motors.

3. An adjustment arrangement according to, claim 1 wherein the plurality of servo motors include two servo motors of like structure and further including a worm or gear transmission mechanism for each of the servo motors, the two transmissions having transmission ratios with a substantially proportionally relationship with each other.

4. An adjusting arrangement according to claim 1 wherein the selector switch is combined in one unit with a key switch in the actuating means.

5. An adjusting arrangement according to claim 1 including a first sensor for detecting the position of the driver's seat and supplying a corresponding signal to the signal transmission means.

6. An adjusting device according to claim 5 including a second sensor for detecting the inclination of a backrest of the driver's seat and supplying a corresponding signal to the signal transmission means.

* * * * *